United States Patent
Robinson et al.

(12) 
(10) Patent No.: US 6,464,404 B1
(45) Date of Patent: Oct. 15, 2002

(54) OPTICAL FIBER REARRANGEMENT METHOD AND DEVICE

(75) Inventors: Matthew Scott Robinson, Charlton, MA (US); Richard Strack, Sturbridge, MA (US)

(73) Assignee: Schott Fiber Optics, Inc., Southbridge, MA (US)

( * ) Notice: Subject to any disclaimer, the term of this patent is extended or adjusted under 35 U.S.C. 154(b) by 0 days.

(21) Appl. No.: 09/597,324

(22) Filed: Jun. 19, 2000

(51) Int. Cl.[7] .............................. G02B 6/40; G02B 6/00
(52) U.S. Cl. ........................................ 385/54; 385/137
(58) Field of Search ...................... 385/54, 135, 137, 385/80, 70

(56) References Cited

U.S. PATENT DOCUMENTS

| | | | |
|---|---|---|---|
| 3,933,556 A | 1/1976 | Strack ..................... 156/155 |
| 4,026,693 A | 5/1977 | Sato ......................... 65/31 |
| 4,185,888 A | 1/1980 | Quelle, Jr. ............... 350/96.25 |
| 4,824,194 A | 4/1989 | Karasawa ................. 350/96.1 |
| 4,932,747 A | 6/1990 | Russell et al. ........... 350/96.24 |
| 4,943,136 A | 7/1990 | Popoff ..................... 350/96.16 |
| 4,952,022 A | 8/1990 | Genovese ................ 350/96.24 |
| 5,136,674 A | 8/1992 | Kakiuchi et al. ............ 385/115 |
| 5,335,306 A | 8/1994 | Takita et al. ................ 385/142 |
| 5,394,503 A | * 2/1995 | Dietz et al. ................. 385/135 |
| 5,715,345 A | 2/1998 | McKinley ................... 385/115 |
| 5,857,051 A | * 1/1999 | Travieso et al. ............ 385/114 |
| 5,862,285 A | 1/1999 | Danielian et al. .......... 385/121 |
| 6,017,154 A | * 1/2000 | Carlisle et al. .............. 385/86 |
| 6,243,520 B1 | * 6/2001 | Goldman .................... 385/115 |

* cited by examiner

*Primary Examiner*—Brian Sircus
*Assistant Examiner*—Chandrika Prasad
(74) *Attorney, Agent, or Firm*—Volpe and Koenig, P.C.

(57) ABSTRACT

The present invention provides an optical interconnection device whereby arrays of fibers or waveguides arranged in a given orientation at an input side are rearranged within the device and exit at an output side arranged in a different orientation from the input side. The method of accomplishing the rearrangement is to first arrange a plurality of ribbon fibers each containing a plurality of individual fibers. This arrangement is then fixed or secured at the output side to form a bundle. The output side bundle is then sliced in a different orientation, for example, in a direction orthogonal to each ribbon fiber at the input. As a result of the slicing, distinct arrays are created at the output side. Alternatively, distinct arrays are created at the output side via manual or automated placement based on a roadmap.

17 Claims, 5 Drawing Sheets

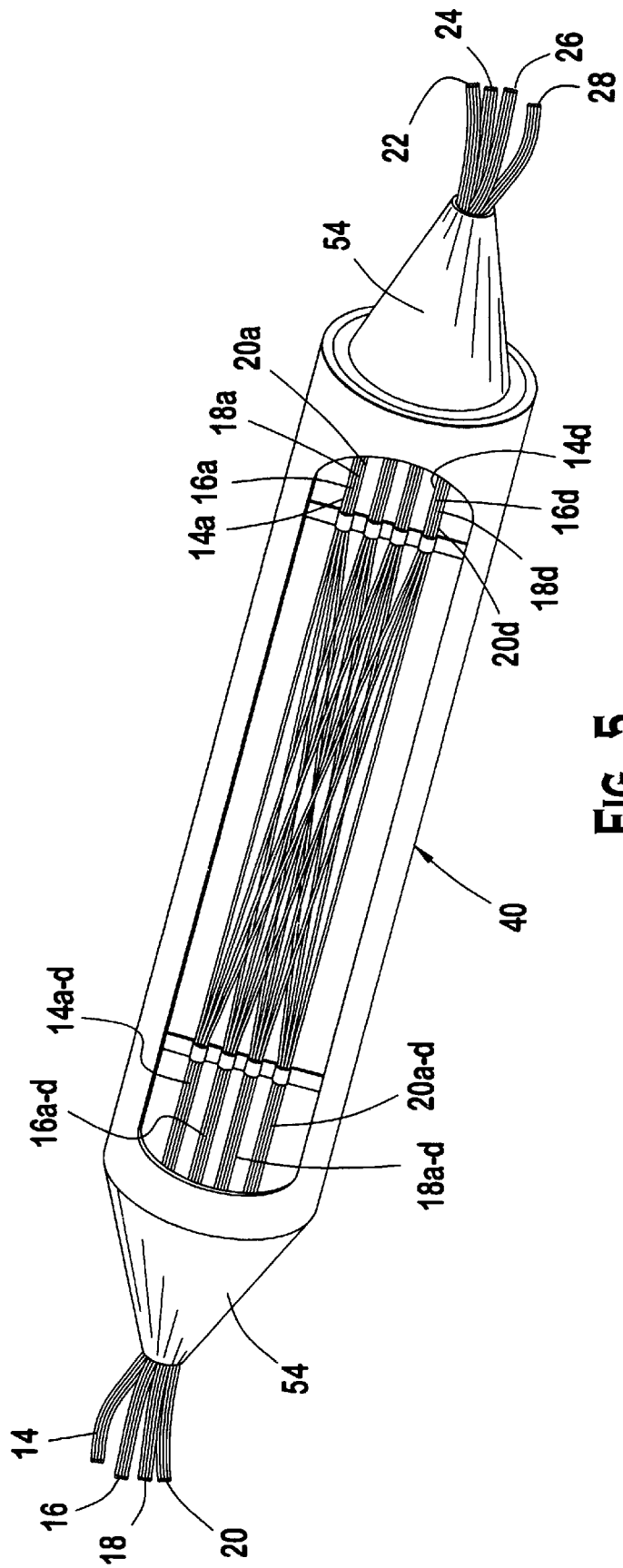

OPTICAL FIBER REARRANGEMENT METHOD AND DEVICE

BACKGROUND

This invention is related to fiber optic communications and more particularly to an optical fiber interconnection device and method for rearranging arrays of optical fibers between an input side and an output side.

The use of fiber optics for high speed communications is finding increased use within large microprocessors and multiple microprocessor systems. For example, in optical switches more and more channels are needed for transmission of data. In back planes, more optical interconnections are required as more daughter cards are added for increasing the number of channels. Cross connects may also be utilized within back planes for communicating between groups of daughter cards or microprocessors. These applications typically require that each daughter card or microprocessor be in communication with each of the other daughter cards or microprocessors in the system. These communications are achieved by connecting optical fibers in a point to point fashion between each daughter card or microprocessor and the other daughter cards or microprocessors in the system. It can therefore be appreciated that as the number of channels required is increased, the number of daughter cards or microprocessors that must communicate with each other is also increased. This creates a problem in that point to point wiring for large numbers of channels is labor intensive, costly, time consuming, and susceptible to connection errors. Additionally, because optical fibers are subject to environmental limitations such as bend radius, fiber management systems are often employed for such large systems of interconnections. Fiber management becomes a challenging problem as a number of channels and the number of point to point connections are increased resulting in higher fiber counts in the backplane.

In one known prior art system of backplane fiber optic interconnections, a single optic fiber is arranged in a desired pattern on a two-dimensional adhesive coated substrate in a controlled manner. The optic fiber is arranged to maintain a minimum bend radius in a two dimensional plane of 25 mm, which is a typical minimum to prevent damage to the fibers. After testing the single optic fiber, the substrate and optic fiber are cut at one or more locations to form an optical backplane interconnect with a desired routing pattern. However, all of the optic fibers are bonded in position requiring additional optical fiber ribbons to make the backplane connections to the printed circuit boards, creating additional optic interfaces which are subject to additional signal losses.

SUMMARY

The present invention addresses these problems by providing an optical interconnection device whereby arrays of fibers arranged in a given orientation at an input are rearranged within the device and exit at an output arranged in a different orientation from the input. A method of accomplishing the rearrangement is to first provide a plurality of fiber arrays each containing a plurality of individual fibers. This arrangement is then fixed at an output side utilizing a suitable method such as an adhesive to form a bundle. The bundle of fibers at the output is then separated, either through an automated or manual process, in a different orientation, for example in a direction orthogonal to each fiber array at the input. Distinct ribbons or arrays are created at the output by the separating operation.

In another aspect, the present invention provides a method of creating an optical fiber interconnection in which arrays of optical fibers are provided. The matrix holding each of the arrays of optical fibers together is partially stripped or leached away at one end of the array. The stripped optical fibers are then rearranged in three-dimensional space into separate output arrays using a manual or automated process based on a desired optic fiber roadmap and bonded or adhered together to form the output arrays of the optical fiber rearrangement device.

BRIEF DESCRIPTION OF THE DRAWINGS

The invention will now be described by way of example with reference to the accompanying figures of which:

FIG. 5 is a perspective view, partially broken away, of a rearranging device in accordance with the present invention.

DETAILED DESCRIPTION OF THE PREFERRED EMBODIMENTS

Figure 1:
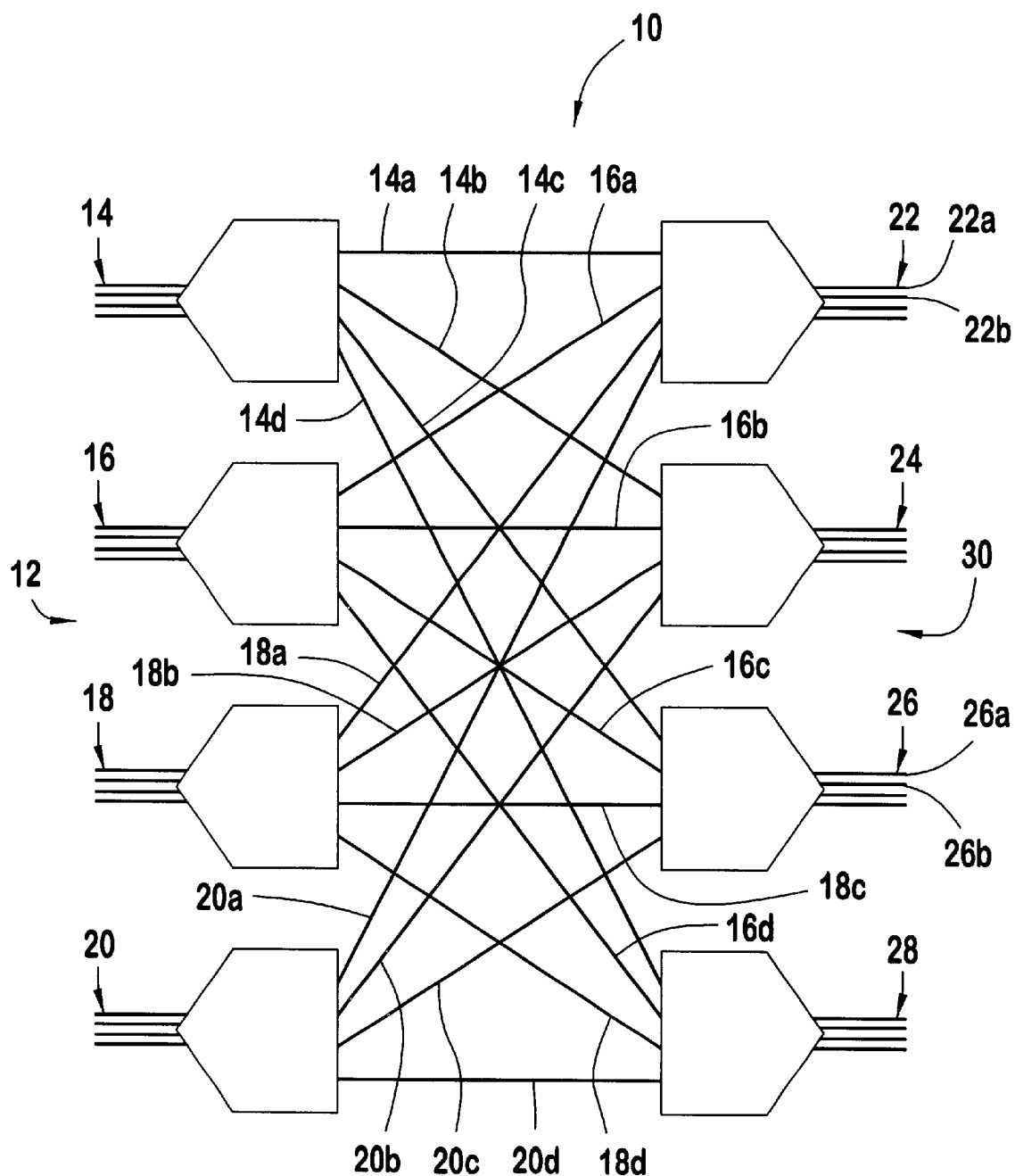
FIG. 1 is a schematic diagram of a representative four by four rearranging device according to the present invention.

A first embodiment of the present invention will now be described in greater detail with reference to FIG. 1. This figure shows an example of a representative four by four optical wave guide communication rearrangement device 10 according to the present invention. The device 10 has an input side 12 and an output side 30. A plurality of optical waveguide arrays 14, 16, 18, 20 are each fed to the input 12. Each optical waveguide array 14, 16, 18, 20 may be formed of optical fibers, such as a ribbon of fiber, individual fibers, fiber cables, or other suitable array configurations, such as optical capillary tubes or other suitable waveguides. Each input array 14, 16, 18, 20 is connected to a respective microprocessor, fiber ribbons or other communication device or medium (not shown). The array 14 is split into individual waveguides or fibers 14a, 14b, 14c, 14d. In the preferred embodiment, optical fibers are utilized and each of the individual fibers 14a–d is fed to a respective output fiber array 22, 24, 26, 28. For example, the fiber 14a is fed to the output fiber array 22. The fiber 14b is fed to the output fiber 24. The fiber 14c is fed to the output array 26 and the fiber 14d is fed to the output array 28. The remaining input fibers 16, 18, 20 are routed similarly to the fiber array 14. The fiber 16a is fed to the output array 22. The fiber 16b is fed to the output array 24. The fiber 16c is fed to the output array 26 and the fiber 16d is fed to the output array 28. Since the input arrays 18 and 20 are similarly routed they will not be described here. The output array 22 therefore contains the first fiber 14a, 16a, 18a, 20a of each of the input arrays 14, 16, 18, 20. Likewise the output array 24 contains the second fiber 14b, 16b, 18b, 20b of each of the input arrays 14, 16, 18, 20. Output arrays 26 and 28 similarly contain the third and fourth fibers of each of the input arrays 14, 16, 18, 20 respectively.

The input arrays 14, 16, 18, 20 may be defined as any number of m×n optical fiber arrays, with the preferred embodiment having m=1 to form ribbon input arrays. The output arrays 22, 24, 26, 28 may also be defined as any number of r×s optical fiber arrays, with the preferred embodiment having r=1 to define ribbon output arrays. The number of input and output arrays may be varied, as can the number of optical fibers in each of the arrays.

While the preferred embodiment described above provides a perfect "shuffle" it will be understood by those skilled in the art from the present disclosure that the fibers could be routed in pairs or groups according to a specified roadmap depending on the requirements of a specific backplane communication interconnection arrangement for which the rearrangement device 10 is being used. For example, in FIG. 1, the fibers 14a and 14b could both go to 22a and 22b; fibers 14c and 14d could both go to 26a and 26b; fibers 16a and 16b could go to 24a and 24b; and so on. Other arrangements could also be utilized, if desired.

Figure 2:
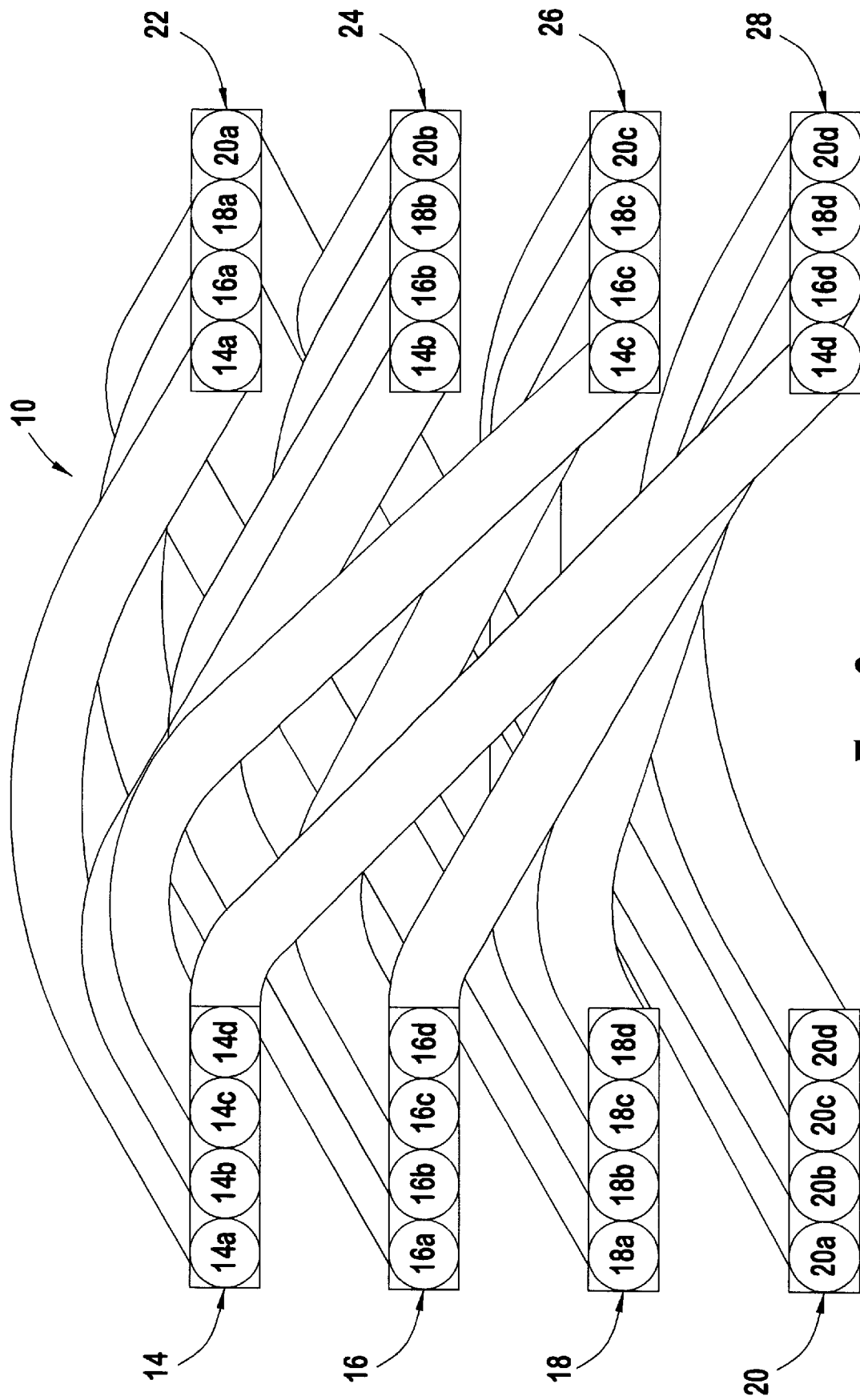
FIG. 2 is a three dimensional view of the input and output of the device of FIG. 1.

Referring now to FIG. 2, the fiber end faces of each of the input arrays 14, 16, 18, 20 and fiber end faces of each of the output arrays 22, 24, 26, 28 are shown. It should be understood by those skilled in the art that while the arrangement pattern of FIGS. 1 and 2 is shown here, other rearrangement schemes are possible and within the scope of this invention. For example, instead of selecting the first fiber of each input array 14, 16, 18, 20 to be a part of the output array 22, one could arrange the output array 22 to receive fiber 14a, fiber 16b, fiber 18c, and fiber 20d. Therefore, each output array 22, 24, 26, 28 may contain any selection of fibers chosen from the input arrays 14, 16, 18, 20.

Figure 3:
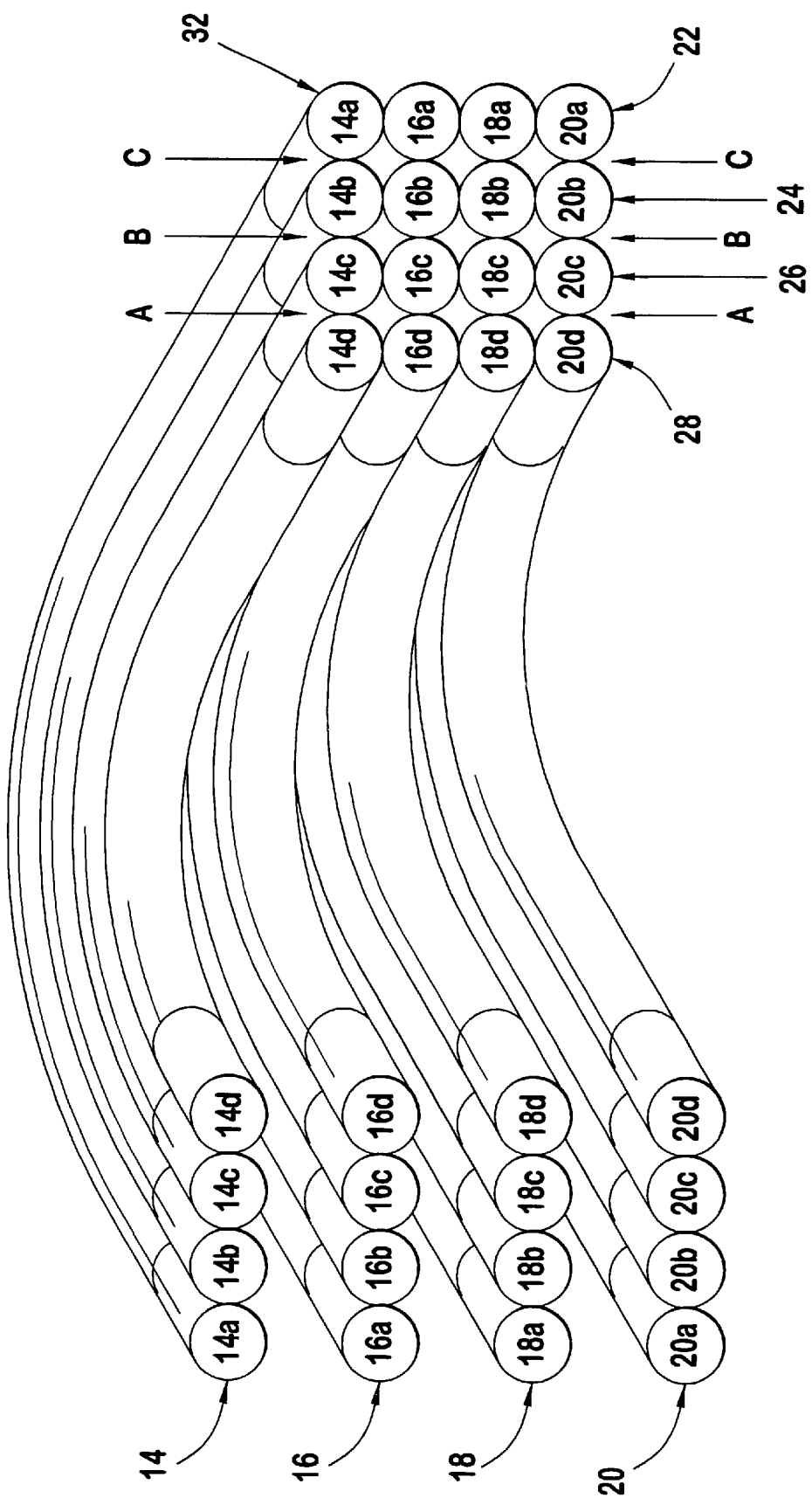
FIG. 3 is a three dimensional view of the device of FIG. 1 during an intermediate assembly step.

A first preferred method of assembling the rearrangement device 10 of FIGS. 1 and 2 will now be described in greater detail with reference to FIGS. 3 and 4. Referring first to FIG. 3, the individual fibers 14a–d are first gathered and secured to form the array 14. This may be accomplished by the use of epoxy, heat or UV activated adhesives, mechanical fasteners, RTV rubbers or any other suitable fixing technique. These arrays may also be formed of ribbon fibers or other multifiber cables. The fibers 16a–d are similarly gathered and secured together to form the input array 16. Input arrays 18 and 20 are similarly formed. At the output 32, in the first preferred method, all of the arrays 14, 16, 18, 20 are bundled and fixed to each other utilizing any suitable technique such as epoxy, UV or heat activated adhesives, mechanical fasteners, RTV rubbers, or any other suitable adhesive or hardenable material. The output bundle 32 is then sliced along the lines labeled A—A, B—B, C—C to form the output arrays 22, 24, 26, 28. Those skilled in the art will understand from the present disclosure that the slices could be along different planes, or could even be in sections or combinations thereof. For example, the optical bundle 32 could be sliced into four 2×2 bundles, two 2×2 bundles and two 1×4 arrays, etc. It should be understood by those skilled in the art that each of the input arrays 14, 16, 18, 20 may be formed of ribbon fibers each containing a desired number of individual fibers. It should also be understood that while a four by four rearrangement device 10 and method have been described here, these methods are scalable to larger arrays or smaller arrays as required by the particular application, such as twelve 1×8 input arrays and eight 1×12 output arrays or any other desired configuration.

A second preferred method of assembling the rearrangement device 10 of FIGS. 1 and 2 will now be described in greater detail below. In the second method, the resin matrix holding each of the input arrays 14a–d, 16a–d, 18a–d and 20a–d of optical fibers together is partially stripped or leached away at one end of the arrays. These stripped optical fibers are then rearranged into output arrays, for example, 14a, 16a, 18a, 20a, etc., using a manual or automated process based on a desired optic fiber roadmap for the interconnection outputs. Each output array is then separately bonded or adhered together, and the stripped fibers can be re-ribbonized, if desired. This provides the advantage of being able to form the rearrangement device 10 with ribbon legs of any desired length which can be used to interconnect backplane components regardless of spacing and without the need for splices.

Figure 4:
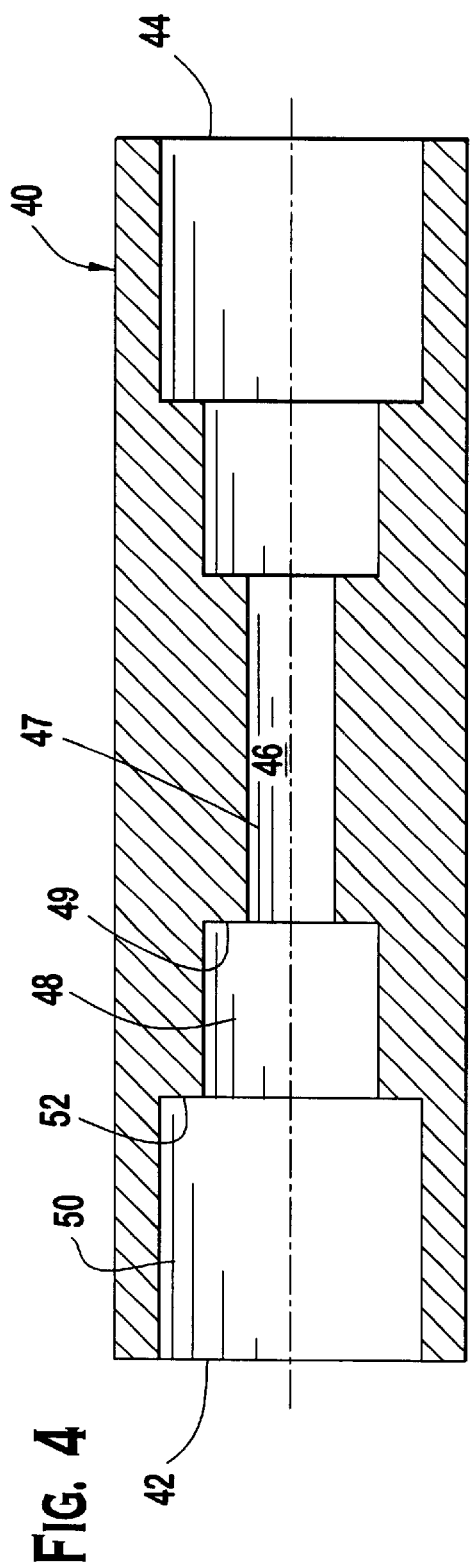
FIG. 4 is a cross-sectional view of an enclosure containing the device of FIG. 1.

Referring now to FIG. 4 a cross-sectional view of a rigid enclosure 40 for housing the rearrangement device 10 is shown. The package 40 may be either cylindrically shaped or rectangularly shaped and may have various cross-sectional areas depending upon the number and shape of the fibers in the bundle 32. Beginning at the input opening 42, the central bore 46 is profiled to have a lead in section 50. The lead is section 50 may have a circular, oval, rectangular or other suitable cross section. A shoulder 52 is formed between the lead in section 50 and a transition section 48. The transition section 48 has a smaller cross sectional area than the lead in section 50 and may be of a circular, oval, rectangular or other suitable shape. A second shoulder 49 is formed between the transition section 48 and retention section 47 of the bore 46. The retention section 47 is dimensioned to snugly receive the plurality of input arrays 14, 16, 18, 20. Since the output side of the enclosure 40 beginning at the output opening 44 is symmetrical to the portion described thus far, it will not be described in further detail. It should be understood however that the enclosure may be modified so that the output section is not symmetrical to the input section. The enclosure may be optionally equipped with through holes for mounting to a system component such as a rack. Alternatively, other attachment means could be provided such as a Velcro® hook and loop fastener, or an adhesive for securing the enclosure 40 to a rack or other components.

Those skilled in the art will also understand from the present disclosure that an enclosure 40 can be molded or cast from a resin matrix directly about the bundle 32. The function of the enclosure is to hold the optical fibers firmly and stably in position in the transition area between the ribbons of the input arrays and the ribbons of the output arrays in order to prevent damage to the individual optical fibers in the transition area.

The rearrangement of the input arrays 14, 16, 18, 20 is represented in FIG. 5 to illustrate the three-dimensional rearrangement that takes place as the fibers of each input array are rearranged in a confined space. The housing 40 preferably includes flexible boots 54 located at each end to act as a strain relief for the input and output arrays. An adhesive, such as an epoxy may be located in the housing 40 to firmly hold the fibers in position in the rearrangement area to prevent damage to the optical fibers.

Figure 6:
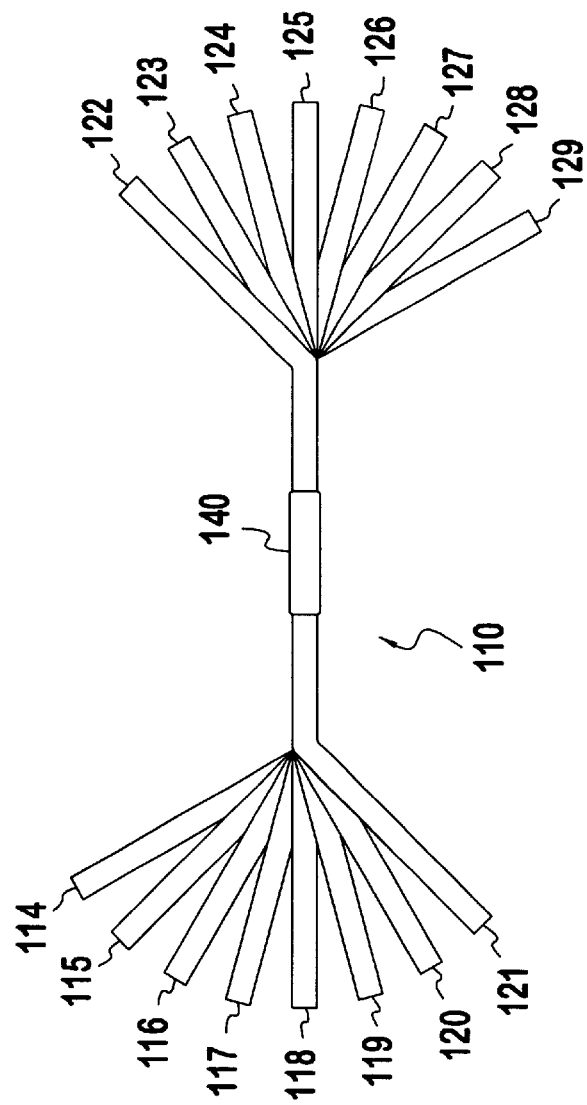
FIG. 6 is a plan view showing an eight by eight rearranging device in accordance with the present invention.

Referring now to FIG. 6, an alternate enclosure 140 is shown in connection with an eight by eight rearrangement device 110. The rearrangement device 110 includes eight input arrays 114–121, and eight output arrays 122–129. The alternate enclosure is made of a braided or woven sleeve that is installed over the rearrangement area of the interconnection device, and is preferably impregnated or filled with an adhesive matrix, such as RTV silicone, to hold the optical fibers in the rearrangement area in firmly and stably in position. One preferred sheath is a VARFLEX sheathing, type HP which is flame retardant. However, it will be recognized by those skilled in the art from the present disclosure that other sheath types of other materials and configurations can be used.

While the present invention has been disclosed in the context of the preferred embodiments utilizing optical fibers, it will be understood by those skilled in the art from the present disclosure that it could also be used in connection with plastic optical fibers or other waveguide materials, such as a leached fiber bundle or hollow capillaries.

An advantage of the present invention is that a large array of input fibers may be rearranged into various arrays of output fibers that contain selected ones from each of the input fibers. These rearrangement techniques can be used to create cross connects, optical 40 switches, backplanes or in any application that requires optical fiber routing in a very small space due to the three-dimensional rearrangement of the fibers in the rearrangement area. For example, in the embodiment shown in FIG. 6, the sheathing which forms the housing 140 is only approximately two inches long and 0.16 inches in diameter. The housing 40 of the first embodiment is also approximately two inches long and approximately 0.5 inches in diameter, allowing for positioning of the rearrangement device 10 in confined spaces.

While the preferred embodiments of the invention have been described in detail, the invention is not limited to the specific embodiments described above, which should be considered as merely exemplary. Further modifications and extensions of the present invention may be developed, and all such modifications are deemed to be within the scope of the present invention as defined by the appended claims.

What is claimed is:

1. An optical rearrangement device comprising:
    an input side including at least first and second separate, flexible input light guide arrays, each of the arrays including a plurality of light guides,
    an output side in which the light guides of the at least first and second light guide arrays are repositioned to form at least first and second separate, flexible output light guide arrays with a first one of the light guides of the first input light guide array being repositioned to extend into the first output light guide array, a second one of the fight guides of the first input light guide array being repositioned to extend into the second output light guide array, and a light guide of the second input light guide array being repositioned to extend into one of the output light guide arrays,
    an enclosure having an input opening and an output opening from which the input and output light guide arrays extend located between the input side and the output side which contains a non-planar, three-dimensional rearrangement area in which the light guides are repositioned, and
    an adhesive located in the enclosure to hold the light guide arrays in position in the rearrangement area.

2. The optical rearrangement device of claim 1 wherein the light guides comprise optic fibers.

3. The optical rearrangement device of claim 1 wherein the first plurality of light guide arrays are a plurality of ribbon fibers.

4. The optical rearrangement device of claim 3 wherein each ribbon fiber represents one of the fiber arrays.

5. The optical rearrangement device of claim 1 wherein the second plurality of light guide arrays are a plurality of ribbon fibers.

6. The optical rearrangement device of claim 5 wherein each ribbon fiber represents one of the fiber arrays.

7. The optical rearrangement device of claim 1 wherein the enclosure further comprises a bore extending between the input opening and the output opening.

8. The optical rearrangement device of claim 7 wherein the bore is profiled to have at least one shoulder positioned between a transition section and a central section.

9. The optical rearrangement device of claim 7 further comprising a flexible boot fixed to the input opening.

10. The optical rearrangement device of claim 7 further comprising a flexible boot fixed to the output opening.

11. The optical rearrangement device of claim 1 wherein the enclosure is made of a flexible material.

12. A method of rearranging a plurality of optical waveguides comprising the steps of:
    arranging a plurality of optical wave guides into at least first and second separate, flexible input wave guide arrays at an input side;
    rearanging the plurality of optical wave guides in a three-dimensional rearrangement area to form at least first and second separate, flexible output arrays at an output side by repositioning at least a first one of the light guides of the first input light guide array to extend into the first output light guide array, repositioning a second one of the light guides of the first input light guide array to extend into the second output light guide array, and repositioning a light guide of the second input light guide array to extend into one of the output light guide arrays,
    enclosing the rearrangement area in a housing having an input opening and an output opening from which input light guide arrays and output light guide arrays respectively extend; and
    holding the optical waveguides stably in position in the rearrangement area.

13. The method of claim 12 further comprising:
    fixing the plurality of input waveguides to form a bundle at an output side; and,
    slicing the bundle in a selected pattern to form the plurality of output arrays at the output side.

14. The method of claim 13 further comprising the step of fixing the bundle to the enclosure.

15. The method of claim 14 further comprising the step of providing a strain relief at the ends of the enclosure.

16. The optical rearrangement device of claim 1 wherein the enclosure is tubular.

17. The method of claim 12, further comprising ribbonizing the output light guides to form the output light guide arrays.

* * * * *

UNITED STATES PATENT AND TRADEMARK OFFICE
CERTIFICATE OF CORRECTION

PATENT NO.    : 6,464,404 B1
DATED         : October 15, 2002
INVENTOR(S)   : Robinson et al.

It is certified that error appears in the above-identified patent and that said Letters Patent is hereby corrected as shown below:

Column 5,
Line 39, after the word "the", delete "fight" and insert therefor -- light --.

Signed and Sealed this

Eighteenth Day of March, 2003

JAMES E. ROGAN
*Director of the United States Patent and Trademark Office*